United States Patent
Conn et al.

(10) Patent No.: US 10,352,142 B2
(45) Date of Patent: Jul. 16, 2019

(54) CONTROLLING OPERATION OF A STEM-ASSISTED GRAVITY DRAINAGE OIL WELL SYSTEM BY ADJUSTING MULTIPLE TIME STEP CONTROLS

(71) Applicant: International Business Machines Corporation, Armonk, NY (US)

(72) Inventors: Andrew R. Conn, Mount Vernon, NY (US); Lior Horesh, North Salem, NY (US); Matthias Kormaksson, Rio de Janeiro (BR); Moshood O. Saliu, Calgary (CA); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/276,178

(22) Filed: Sep. 26, 2016

(65) Prior Publication Data

US 2018/0087359 A1    Mar. 29, 2018

(51) Int. Cl.
*E21B 43/24*    (2006.01)
*E21B 41/00*    (2006.01)
(Continued)

(52) U.S. Cl.
CPC ...... *E21B 43/2406* (2013.01); *E21B 41/0092* (2013.01); *G05B 13/048* (2013.01); *G06F 17/11* (2013.01)

(58) Field of Classification Search
CPC combination set(s) only.
See application file for complete search history.

(56) References Cited

U.S. PATENT DOCUMENTS 6,257,334 B1    7/2001    Cyr et al.
7,879,768 B2    2/2011    Wu
(Continued)

FOREIGN PATENT DOCUMENTS

CN    203905930 U    10/2014

OTHER PUBLICATIONS

N.V. Queipo et al., "Surrogate Modeling-Based Optimization of SAGD Processes," Journal of Petroleum Science and Engineering, Jul. 2002, pp. 83-93, vol. 35, Nos. 1-2.

(Continued)

*Primary Examiner* — Kenneth M Lo
*Assistant Examiner* — Chad G Erdman
(74) *Attorney, Agent, or Firm* — Vazken Alexanian; Ryan, Mason & Lewis, LLP

(57) ABSTRACT

A method for increasing efficiency in emulsion production for a steam-assisted gravity drainage (SAGD) oil well system includes generating a multiple time step model of the SAGD oil well system and training the multiple time step model of the SAGD oil well system utilizing historical time series data relating to one or more SAGD oil wells at one or more SAGD production sites of the SAGD oil well system. The historical time series data is obtained from a plurality of sensors in the SAGD oil well system. The method also includes utilizing the multiple time step model to determine, based on a set of objectives and subject to one or more constraints, two or more sets of values for control parameters associated with one or more of the SAGD production sites of the SAGD oil well system for respective ones of two or more time steps. The method further includes adjusting, in each of the two or more time steps, a set of controls of the SAGD oil well system based on the determined values of the control parameters for the corresponding time step.

20 Claims, 8 Drawing Sheets

(51) Int. Cl.
*G05B 13/04* (2006.01)
*G06F 17/11* (2006.01)

(56) References Cited

U.S. PATENT DOCUMENTS

| | | | |
|---|---|---|---|
| 8,146,669 B2 | 4/2012 | Mason | |
| 8,756,019 B2 | 6/2014 | Pimenov et al. | |
| 8,849,639 B2 | 9/2014 | Brown et al. | |
| 8,977,502 B2 | 3/2015 | Liu | |
| 9,043,189 B2 | 5/2015 | Wallace et al. | |
| 9,085,958 B2* | 7/2015 | Laing | E21B 49/003 |
| 9,163,497 B2* | 10/2015 | Laing | E21B 47/042 |
| 9,803,469 B2 | 10/2017 | Kaiser et al. | |
| 9,964,654 B2 | 5/2018 | Laake | |
| 10,088,596 B2 | 10/2018 | Maerten | |
| 2006/0095872 A1 | 5/2006 | McElvain et al. | |
| 2007/0055392 A1* | 3/2007 | D'Amato | G05B 13/048 700/44 |
| 2009/0166033 A1 | 7/2009 | Brouwer et al. | |
| 2011/0060572 A1 | 3/2011 | Brown | |
| 2011/0288778 A1 | 11/2011 | Pavlovich et al. | |
| 2011/0320047 A1 | 12/2011 | Stone et al. | |
| 2012/0024524 A1 | 2/2012 | Marsimovich et al. | |
| 2012/0059640 A1 | 3/2012 | Roy et al. | |
| 2013/0105147 A1* | 5/2013 | Scott | E21B 43/14 166/245 |
| 2013/0175030 A1* | 7/2013 | Ige | E21B 43/128 166/250.15 |
| 2013/0262061 A1 | 10/2013 | Laake | |
| 2013/0277049 A1 | 10/2013 | Liu | |
| 2014/0124194 A1* | 5/2014 | Jorshari | E21B 43/2406 166/245 |
| 2014/0216732 A1 | 8/2014 | Stone et al. | |
| 2014/0216739 A1 | 8/2014 | Brown et al. | |
| 2014/0352966 A1 | 12/2014 | Yuan | |
| 2015/0009499 A1 | 1/2015 | Lin et al. | |
| 2015/0114633 A1 | 4/2015 | Godfrey et al. | |
| 2015/0161304 A1* | 6/2015 | Vachon | G01V 99/005 703/10 |
| 2015/0198022 A1 | 7/2015 | Stanecki et al. | |
| 2015/0354336 A1* | 12/2015 | Maurice | E21B 43/2406 706/12 |
| 2016/0032692 A1* | 2/2016 | Conn | E21B 41/0092 700/275 |
| 2016/0054713 A1 | 2/2016 | Foss et al. | |
| 2016/0098502 A1* | 4/2016 | Havre | G06F 17/5009 703/9 |
| 2016/0201453 A1 | 7/2016 | Kaiser et al. | |
| 2016/0245065 A1 | 8/2016 | Gray et al. | |
| 2016/0245071 A1 | 8/2016 | Vincelette et al. | |
| 2016/0251957 A1 | 9/2016 | Mcewen-king et al. | |
| 2016/0281497 A1 | 9/2016 | Tilke et al. | |
| 2016/0312592 A1 | 10/2016 | Chen et al. | |
| 2016/0312599 A1* | 10/2016 | Adam | E21B 43/00 |
| 2017/0045055 A1 | 2/2017 | Hoefel et al. | |
| 2017/0051597 A1 | 2/2017 | Akiya et al. | |
| 2017/0177992 A1 | 6/2017 | Klie | |
| 2017/0336811 A1* | 11/2017 | Stone | E21B 43/12 |
| 2017/0350217 A1* | 12/2017 | Paul | G06F 3/00 |
| 2017/0351227 A1* | 12/2017 | Paul | E21B 43/00 |
| 2018/0087371 A1 | 3/2018 | Vincelette et al. | |
| 2018/0195374 A1 | 7/2018 | Stalder | |

OTHER PUBLICATIONS ip.com, "Methods for SAGD Optimization," ip.com No. IPCOM000213572D, Dec. 21, 2011, 10 pages.

H.X. Nguyen et al., "Experimental Design to Optimize Operating Conditions for SAGD Process," Society of Petroleum Engineers (SPE), SPE Asia Pacific Oil & Gas Conference and Exhibition, SPE 145917, Sep. 2011, 11 pages, Jakarta, Indonesia.

Dennis Denney, "Real-Time Optimization of SAGD Operations," Society of Petroleum Engineers, Journal of Petroleum Technology (JPT), Jun. 2013, pp. 126-128, vol. 65, No. 6.

Shin et al., "Review of Reservoir Parameters to Produce SAGD and Fast-SAGD Operating Conditions," Journal of Canadian Petroleum Technology (JCPT), Jan. 2007, pp. 35-41, vol. 46, No. 1.

English translation for China Application No. CN203905930U.

List of IBM Patents or Patent Applications Treated as Related.

N. Alali et al., "Neural Network Meta-Modeling of Steam Assisted Gravity Drainage Oil Recovery Processes," Iranian Journal of Chemistry & Chemical Engineering, vol. 29, No. 3, Sep. 2010, pp. 109-122.

C. Blundell et al., "Weight Uncertainty in Neural Networks," 2015, 10 pages.

* cited by examiner

100

300

400

500

CONTROLLING OPERATION OF A STEM-ASSISTED GRAVITY DRAINAGE OIL WELL SYSTEM BY ADJUSTING MULTIPLE TIME STEP CONTROLS

CROSS-REFERENCE TO RELATED APPLICATIONS

The present application is related to commonly-assigned U.S. patent application Ser. No. 15/276,152, entitled "Controlling Operation of a Steam-Assisted Gravity Drainage Oil Well System Utilizing Continuous and Discrete Control Parameters," to commonly-assigned U.S. patent application Ser. No. 15/276,168, entitled "Controlling Operation of a Steam-Assisted Gravity Drainage Oil Well System by Adjusting Controls to Reduce Model Uncertainty," and to commonly-assigned U.S. patent application Ser. No. 15/276,189, entitled "Controlling Operation of a Steam-Assisted Gravity Drainage Oil Well System by Adjusting Controls Based on Forecast Emulsion Production," which are filed concurrently herewith and incorporated by reference herein.

BACKGROUND

The present application relates to operation, and more specifically, to controlling operation of a steam-assisted gravity drainage (SAGD) oil well system. SAGD is a shale oil production methodology. In a SAGD oil well system, also referred to herein as a SAGD system, steam is injected through one or more injector wells and oil is extracted through one or more producer wells. Generally, injector wells and producer wells are arranged in pairs. A group of such well pairs may be organized as a pad or SAGD production site, such as a pad including six well pairs.

SUMMARY

Embodiments of the invention provide techniques for modeling a SAGD oil well system and utilizing the model of the SAGD oil well system to adjust multiple time step controls for the SAGD oil well system.

For example, in one embodiment, a method for increasing efficiency in emulsion production for a SAGD oil well system comprises generating a multiple time step model of the SAGD oil well system and training the multiple time step model of the SAGD oil well system utilizing historical time series data relating to one or more SAGD oil wells at one or more SAGD production sites of the SAGD oil well system. The historical time series data is obtained from a plurality of sensors in the SAGD oil well system. The method also comprises utilizing the multiple time step model to determine, based on a set of objectives and subject to one or more constraints, two or more sets of values for control parameters associated with one or more of the SAGD production sites of the SAGD oil well system for respective ones of two or more time steps. The method further comprises adjusting, in each of the two or more time steps, a set of controls of the SAGD oil well system based on the determined values of the control parameters for the corresponding time step. The method is performed by at least one processing device comprising a processor coupled to a memory, the processing device being operatively coupled to the SAGD oil well system.

In another embodiment, a computer program product for increasing efficiency in emulsion production for a SAGD oil well system comprises a computer readable storage medium for storing computer readable program code. The computer readable program code, when executed, causes a computer to generate a multiple time step model of the SAGD oil well system and to train the multiple time step model of the SAGD oil well system utilizing historical time series data relating to one or more SAGD oil wells at one or more SAGD production sites of the SAGD oil well system. The historical time series data is obtained from a plurality of sensors in the SAGD oil well system. The computer readable program code, when executed, also causes the computer to utilize the multiple time step model to determine, based on a set of objectives and subject to one or more constraints, two or more sets of values for control parameters associated with one or more of the SAGD production sites of the SAGD oil well system for respective ones of two or more time steps. The computer readable program code, when executed, further cause the computer to adjust, in each of the two or more time steps, a set of controls of the SAGD oil well system based on the determined values of the control parameters for the corresponding time step.

In another embodiment, an apparatus for increasing efficiency in emulsion production for a SAGD oil well system comprises a memory and a processor coupled to the memory. The processor is configured to generate a multiple time step model of the SAGD oil well system and to train the multiple time step model of the SAGD oil well system utilizing historical time series data relating to one or more SAGD oil wells at one or more SAGD production sites of the SAGD oil well system. The historical time series data is obtained from a plurality of sensors in the SAGD oil well system. The processor is also configured to utilize the multiple time step model to determine, based on a set of objectives and subject to one or more constraints, two or more sets of values for control parameters associated with one or more of the SAGD production sites of the SAGD oil well system for respective ones of two or more time steps. The processor is further configured to adjust, in each of the two or more time steps, a set of controls of the SAGD oil well system based on the determined values of the control parameters for the corresponding time step.

DETAILED DESCRIPTION

Figure 1:
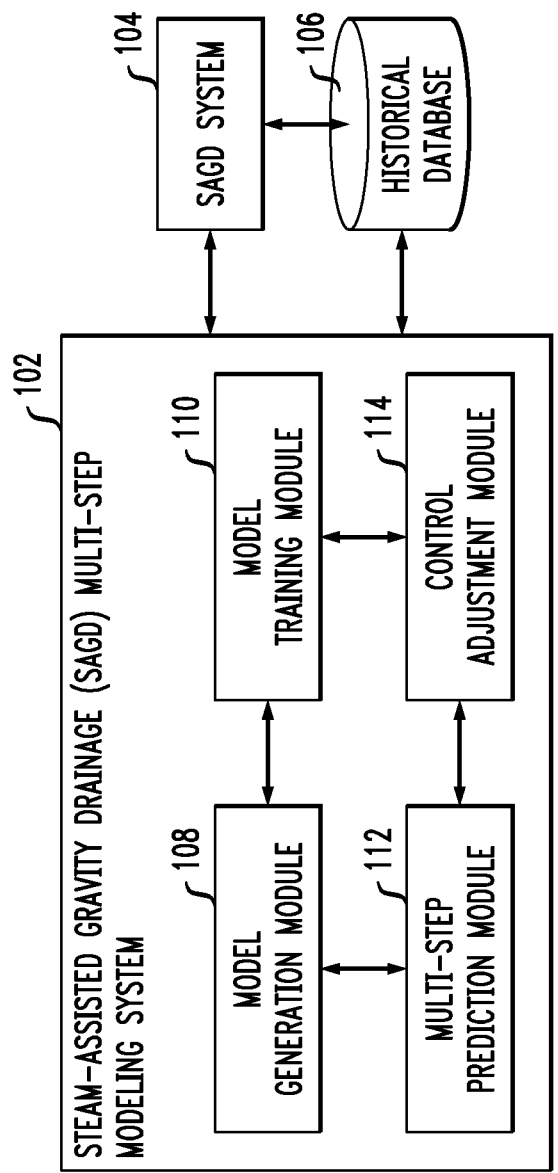
FIG. 1 depicts a system for controlling operation of a SAGD system by adjusting multiple time step controls, according to an embodiment of the present invention.

Illustrative embodiments of the invention may be described herein in the context of illustrative methods, systems and devices for controlling operation of a SAGD oil well system to increase efficiency in emulsion production by adjusting multiple time step controls of the SAGD oil well system. However, it is to be understood that embodiments of the invention are not limited to the illustrative methods, systems and devices but instead are more broadly applicable to other suitable methods, systems and devices.

While various illustrative embodiments are described below in the context of a SAGD oil well system, embodiments are not necessarily limited solely to use with SAGD systems. Instead, the techniques described herein may be used for other types of oil production systems and other types of systems which may benefit from the use of physics-based multiple time step predictive modeling.

SAGD, as mentioned above, is a non-conventional oil production methodology. SAGD refers to a method of extracting bitumen from oil sands. In some arrangements, steam is injected under pressure into one of two parallel horizontal wells, referred to herein as an injector well, to heat the surrounding earth. Heating the earth reduces a viscosity of the bitumen contained in the oil sands, allowing the bitumen to flow under gravity. The bitumen is heated until it flows through porous rock. As an example, it may take a few months to heat the earth to a sufficient temperature, such as 150° C., so that the bitumen will flow under gravity. The flow of bitumen and water condensate is collected and extracted from the other of the two parallel horizontal wells, referred to herein as a producer well. Generally, the producer well is lower or deeper in the earth relative to the injector well. Individual wells, such as the injector and/or producer well, may be slotted and/or valved to facilitate optimal extraction of bitumen from the oil sands.

The two parallel horizontal wells form a well pair. A SAGD production site or pad may include multiple well pairs. For example, a pad may be arranged as a square of concrete with six well pairs. A SAGD system may include multiple pads or production sites, as will be described in further detail below.

The proportion of bitumen in the emulsion for a given SAGD well pair will typically increase over time as the earth is heated. In some cases, a ratio of 2:1 between water and bitumen is considered a good ratio. Various factors may affect the emulsion rate and this ratio, including but not limited to the history of the well, temperature, porosity, the amount of bitumen in the surrounding earth, etc.

Operation of a SAGD system may involve several controls, including but not limited to the rate of steam injected, steam allocation to various sites and/or well pairs, gas casing pressure, extracted emulsion pressure, etc. The SAGD system may be instrumented with a number of sensors that provide at least partial information regarding a state of the SAGD system. Observables which may be measured using such sensors include but are not limited to emulsion rate, temperature profile along the length of a well, sub-cool profile, bottom hole pressure, gas blanket pressure, steam injection surface pressure, etc.

As one non-limiting example, consider a well pair in a SAGD system, wherein the surface pressure injection for the injector well is 2500 kiloPascals (kPa) for the casing and 3200 kPa for the tubing. The pressure will gradually be reduced as a steam chamber develops around the injector well. The bottom hole pressure of the injector well may be, for example, 2700 kPa, while the toe steam pressure in the injector well may by 2600 kPa. For the producer well, the bottom hole pressure may be 2600 kPa, with a tubing heel pressure of 2400 kPa and a tubing toe pressure of 2500 kPa. The surface production pressure, or the extracted emulsion pressure, may be in the range of 400-1000 kPa. The injector and producer wells of a well pair may have a horizontal length in the range of 500 to 1000 meters (m). The vertical distance between the injector and producer well may be approximately 5 m. The oil sands layer may begin 250 to 300 m or more from the surface. For example, a cap rock layer of shale and glacial till may range in thickness above the oil sands layer of the earth. The injector and producer well would thus have a vertical distance from the surface exceeding the thickness of the cap rock layer, which as mentioned above may be in the range of 250 to 300 m.

Costs in a SAGD system may be dominated by the cost of heating the steam relative to the amount of bitumen extracted. Greater steam injection rates generally increase the heat and amount of bitumen recovery, but are subject to constraints and in some cases diminishing returns. Such constraints include but are not limited to the need to keep the pressure in a well below the amount that would cause damage to the well or breach the overburden, avoiding conditions that would ingest steam into a producer well, etc.

A SAGD system may include a field with a number of production sites and many different well pairs. The SAGD system, however, will often have a finite amount of steam to distribute. The decision of how to best distribute the steam to different production sites and well pairs is an optimization problem. In some cases, a brokerage system may be used, where different well pairs or production sites provide estimates of the amount of bitumen that may be extracted day to day and steam is allocated based on such estimates.

A key challenge in SAGD operation is to determine an optimal set of controls that maximize or increase the yield of the system while honoring operational constraints. Maximizing or increasing yield may include maximizing or increasing emulsion rate, minimizing or reducing a cumulative steam to oil ratio in the emulsion, maximizing or increasing a net present value, etc. Operational constraints may include certain upper bounds on pressure such as bottom hole pressure, certain bounds on temperature such as minimum temperatures at different locations along injector and/or producer wells, sub-cool thresholds, etc.

Physics based predictive models may be difficult to generate in a cost-effective manner. For example, each well pair may be subject to different geology and bitumen environments. Thus, a detailed physical model of a well pair may require prescription of model parameters everywhere at all times, leading to great uncertainty. Physics based models may also require the prescription of a large number of "nuisance" parameters, such as porosity, permeability, heat coefficients throughout a field, etc. The nuisance parameters are so named to indicate that they are cost prohibitive or to indicate that there are no definitive means for determining such parameters in a real-world setting. As a consequence, ad-hoc or often generic values may be prescribed.

Such ad-hoc assignment of values may lead to biased predictions, as the values assigned may not properly distinguish the specific characteristics of individual wells, and therefore may fail to provide high fidelity results. In addition, some of the underlying multi-physics phenomena of SAGD systems are not fully realized thus further limiting the effectiveness of physics based predictive models. For example, the underlying physics of a SAGD system is complex, involving heat transfer (diffusion and advection), flow in a porous medium, various chemical processes, etc. Physics based predictive modeling may involve a number of simplifying assumptions that affect the accuracy of results. As an example, some models may treat well pairs as independent although this is not necessarily the case. Consider three well pairs arranged side by side. The left and right well pairs may be subject to more heating loss relative to the center well pair, which is shielded by the left and right well pairs. In addition, thermal communication between well pairs may result from channels through the rock or earth surrounding such well pairs.

Data driven or statistical approaches for modeling SAGD systems also suffer from disadvantages. For example, statistical methods may be agnostic to the underlying physical process, and thus their ability to offer reliable prediction is limited. In particular, as the underlying system is causal, a SAGD system is likely to respond differently to the same set of control inputs at different times. Such system behavior is difficult to model or cannot be modeled reliably, especially when little data is provided or available at an early stage of operation, in situations where values outside a training set are requested, or when long-term prediction is desired. In addition, statistical methods may require significant ramp-up time to accumulate sufficient data for training. Further, models may be tailored such that they are overly specific to one well pair and thus not generalizable to other well pairs.

Due to various limitations of standard predictive models in reliably predicting the response of a SAGD system for an extended duration, some optimization strategies may seek to prescribe a set of controls for optimizing production in just a single unit of time, such as for a single day. The subsurface dynamics of a SAGD system, as described above, may be of a complex multi-physics nature involving diffusion, advection, heat transfer, etc. that span across multi-scale time periods that extend beyond a single time unit such as a day. As such, there can be significant advantages in being able to choose parameters that maximize or increase emulsion production at minimum cost under various constraints that extend beyond a single time unit.

Various embodiments are described herein wherein each time step refers to a single day, but embodiments are not so limited. Longer or shorter time steps may be utilized as desired. In some cases, a shorter time step may be desired as the increased control may permit greater optimization. Use of a shorter time step, however, can increase the computational complexity or processing time for making predictions. In cases where limited processing resources are available, it may be desired to use a longer time step. The selection of the length of the time step can thus be a tradeoff tailored to the needs of a particular application.

The subsurface dynamics of a SAGD system, as described above, is of a complex multi-physics nature across multi-scale time periods which may not be adequately captured using a single-step prediction, such as individual day-to-day predictions.

Some embodiments overcome one or more of these or other disadvantages to provide techniques for modeling a SAGD system and for utilizing such modeling to adjust multiple time step controls for a SAGD system. Such techniques can provide clear benefits in prescribing controls for a SAGD system while accommodating a longer time horizon to facilitate investing in longer-term strategies resulting in higher return over the longer time horizon, even if such strategies on a short-term myopic scope do not appear to be cost-effective.

Using the techniques described herein, the selection of controls for SAGD system may be optimized or improved such that operation of the SAGD system may be controlled to increase the efficiency of emulsion production. Increasing the efficiency of emulsion production may include increasing emulsion output, reducing a water to oil or bitumen ratio of the emulsion, reducing an amount of steam required to achieve a given emulsion output, etc. Increased efficiency of emulsion production may be accounted for in the objectives used, further examples of which are described below.

One approach for multiple time step modeling is re-launching a single step optimization framework multiple times, each time feeding the framework with the predictions from a previous time step. Such an approach, however, may still be myopic as it may not foresee the advantages of making long term investments but instead seeks immediate gratification at each time step, i.e., it is a greedy approach.

In some embodiments, techniques are provided for the prescription of multiple time step controls for a SAGD system. Such techniques employ single step predictive model functionality to construct a multi-step predictive model. The single step predictive model ingests or takes as input a previous time step prediction and a set of control parameters to provide the next set of predictions. The multi-step predictive model takes as input an initial prediction along with multiple time step sets of values for control parameters to provide predictions for multiple time steps. Using the multiple time step prediction functionality, a multi-step optimization framework can be formulated. The multi-step optimization framework can be used to search for a set of values for control parameters for multiple time steps that optimize or improve productivity of a SAGD system, given a set of objectives and subject to one or more constraints. Output from the multi-step optimization framework can be used to control the SAGD system.

FIG. 1 shows a system 100, including a SAGD multi-step modeling system 102, SAGD oil well system 104 and historical database 106. Although not explicitly shown, the SAGD multi-step modeling system 102, SAGD system 104 and historical database 106 may be connected or operatively coupled to one another possibly via one or more networks. The SAGD multi-step modeling system 102 is configured to obtain sensor data from the SAGD system 104 and/or the historical database 106, and utilizes the sensor data and a model to make predictions for multiple time steps and to utilize such predictions to adjust controls of the SAGD system 104. Details regarding a possible implementation of SAGD system 104 will be discussed in further detail below with respect to FIG. 2.

SAGD multi-step modeling system 102 includes model generation module 108, model training module 110, multi-step prediction module 112 and control adjustment module 114. The model generation module 108 is configured to generate a multiple time step model of the SAGD system 104. The multiple time step model may utilize various types of machine learning and neural networks, including various types of feed-forward neural networks including but not limited to nonlinear autoregressive exogenous model (NARX) neural networks. In some embodiments, other learning paradigms may be used including but not limited to support vector, boosted support vector and random forest classifiers. Some of these learning paradigms, such as random forest, provide an additional benefit of ranking control parameters according to their relative influence on output variables. In some embodiments, these rankings or other information may be used to identify the degree of cross coupling in well pairs.

The model training module 110 is configured to train the multiple time step model generated by the model generation module 108 utilizing historical time series data relating to the SAGD system 104. The historical time series data may be based on time series historical sensor data from different SAGD well pairs in the SAGD system 104. The historical time series data may be obtained by the SAGD multi-step modeling system 102 from the SAGD system 104 itself or via historical database 106. The time series historical sensor data may include but is not limited to steam mass flow, temperature and pressure, emulsion mass flow, etc. The time series historical sensor data may also include data particular to one or both of the injector well and the producer well in a given well pair, such as temperature along the lengths of such wells or at intervals thereof, information such as net injected energy, integrated or current injected energy, net mass flow, integrated or current mass flow, etc.

Multi-step prediction module 112 utilizes the multiple time step model, generated by model generation module 108 and trained using model training module 110, to determine sets of values for control parameters associated with the SAGD system for multiple time steps. The values for the control parameters are determined based on a set of objectives and are subject to various constraints, as will be described in further detail below. Control adjustment module 114 utilizes the determined values for the control parameters to adjust controls of the SAGD system in multiple time steps.

While FIG. 1 shows a system 100 wherein the SAGD multi-step modeling system 102 is separate from the SAGD system 104, embodiments are not so limited. In some embodiments, the SAGD multi-step modeling system 102 may be incorporated in or otherwise be part of the SAGD system 104. The historical database 106 may also be incorporated at least in part in one or both of the SAGD multi-step modeling system 102 and SAGD system 104. Further, while system 100 shows SAGD multi-step modeling system 102 connected to a single SAGD system 104, embodiments are not so limited. A single instance of the SAGD multi-step modeling system 102 may be connected to or used to adjust controls of multiple distinct SAGD oil well systems in other embodiments. Also, while not explicitly shown in FIG. 1 the SAGD multi-step modeling system 102 may be part of a cloud computing environment or other processing platform, as will be discussed in further detail below with respect to FIGS. 6-8.

Figure 2:
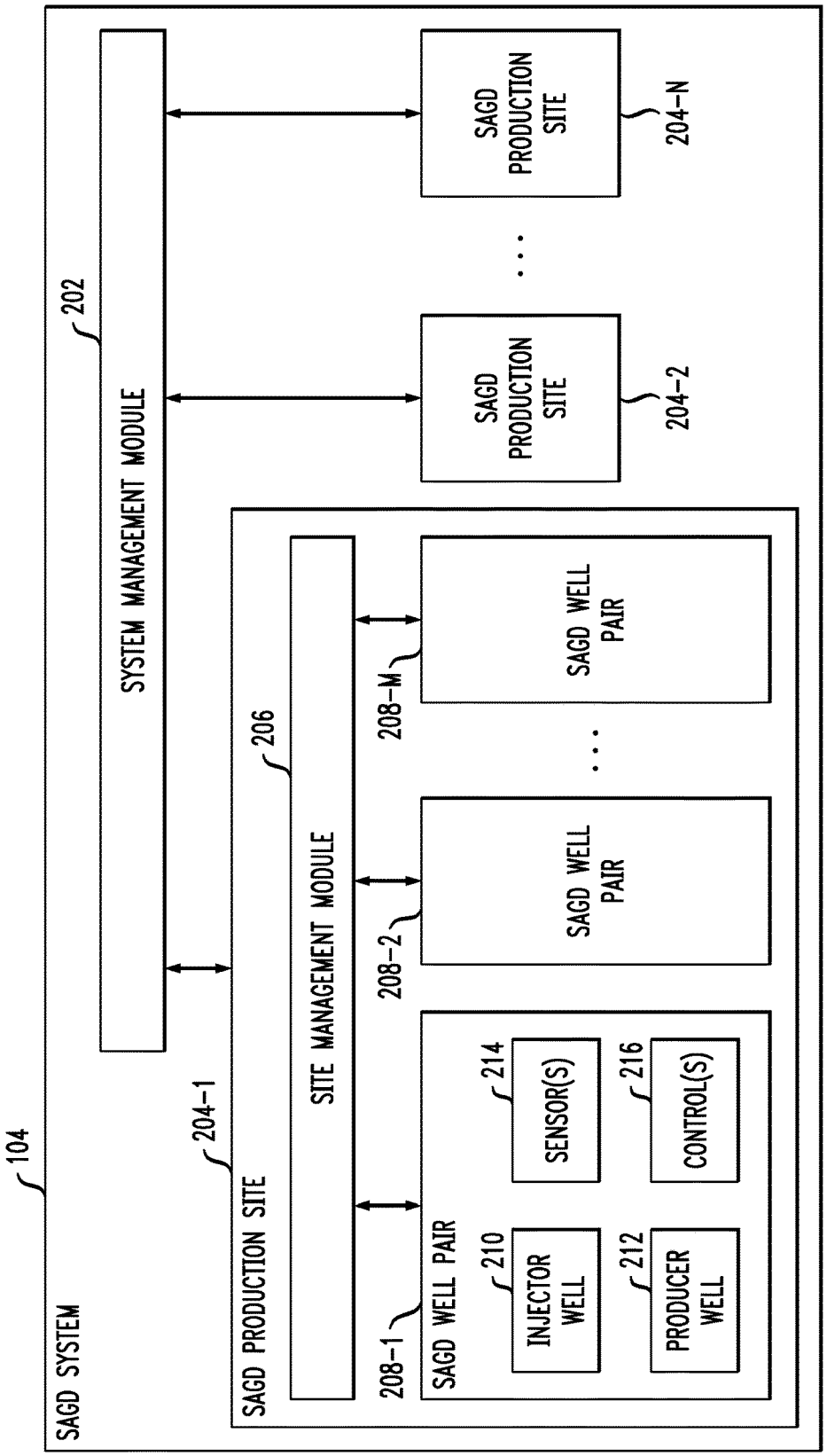
FIG. 2 depicts a detailed view of the SAGD system shown in FIG. 1, according to an embodiment of the present invention.

FIG. 2 shows a detailed view of an illustrative implementation of the SAGD system 104. As shown, the SAGD system 104 includes a system management module 202 and SAGD production sites 204-1, 204-2, . . . 204-N collectively referred to herein as SAGD production sites 204. The system management module 202 may receive control information from the SAGD multi-step modeling system 102, and utilize such information to set or adjust various controls at the SAGD production sites 204. Such controls may include, by way of example, steam allocation to different ones of the SAGD production sites 204. In some embodiments, the system management module 202 may incorporate or otherwise provide the functionality of the SAGD multi-step modeling system 102.

SAGD production site 204-1 includes a site management module 206 and SAGD well pairs 208-1, 208-2, . . . 208-M collectively referred to herein as SAGD well pairs 208. The site management module 206 may communicate with or receive control information from system management module 202, and utilizes such information to set or adjust controls at respective ones of the SAGD well pairs 208. It is to be appreciated that a particular SAGD system 104 may include only a single SAGD production site, such as SAGD production site 204-1. In these and other cases, the site management module 206 may incorporate or otherwise provide the functionality of the SAGD multi-step modeling system 102.

Sensors 214 may include temperature sensors, pressure sensors, sub-cool sensors, flow rate sensors, flow sensors, mass flow sensor, densitometers, etc. Pressure sensors may take various forms, including bottom hole sensors, surface pressure sensors, blanket gas pressure sensors, etc. Temperature sensors may also take various forms, including thermocouples, fiber optics, distributed temperature systems (DTSs), etc. providing temperature readings across vertical and horizontal sections of a well. A DTS can provide temperature readings at intervals (e.g., one meter) along injector and producer legs of a well pair. Pressure sensors may be fewer in number relative to temperature sensors, and may be located at strategic points to measure observables of interest mentioned above. The relative numbers of temperature and pressure sensors, however, may various as desired and it is not a requirement that temperature sensors outnumber pressure sensors.

The controls 216 are adjusted based on instructions or information received from the SAGD multi-step modeling system 102 via site management module 206 and system management module 202. Controls 216 may include valves to control the flow of steam in injector well 210 or the rate of emulsion flow from producer well 212, the pressure of injected steam, the rate at which emulsion is pumped, the emulsion pressure, the temperature of the injected steam, the allocation of injected steam to different parts of a well (e.g., heel vs. toe), etc. Valves may be manually or automatically actuated in different embodiments. Controls 216 may also include mass flow controllers, pumps, etc. In some embodiments, each well pair is controlled by a set of five continuous control variables or parameters and one discrete control variable or parameter. The continuous control parameters may include, for a given well pair, the heel steam rate, toe steam rate, heel lift gas flow, toe lift gas flow and emulsion pressure. The discrete control parameter for the given well pair may indicate whether the well is active or inactive.

Although not explicitly shown in FIG. 2, other ones of the well pairs 208 may be configured with an injector well, producer well, sensors and controls in a manner similar to that described above with respect to well pair 208-1. Also, although not explicitly shown in FIG. 2 other ones of the SAGD production sites may be configured with site management modules and SAGD well pairs in a manner similar to that described above with respect to SAGD production site 204-1. Further, while FIG. 2 shows an arrangement in which the SAGD system 104 includes sensors that are local to individual SAGD well pairs, embodiments are not so limited. In some cases, SAGD production site 204-1 may include one or more sensors that collect information common to multiple ones of the SAGD well pairs 208. In a similar manner, the SAGD system 104 may include one or more sensors that collect information common to multiple ones of the SAGD production sites 204.

In some embodiments, physics inspired values are used to express the state of a given one of the SAGD well pairs 208, a given one of the SAGD production sites 204 or the SAGD system 104 at any given time. Such physics inspired values include but are not limited to steam mass flow, temperature and pressure, emulsion mass flow and temperature, temperature along injector and producers legs of a well pair (at intervals thereof or selected regions of interest), net injected energy, integrated energy, net mass, integrated net mass, etc. This information may be used in generating a model of the SAGD system 104, where the model comprises or otherwise utilizes one or more machine learning algorithms including but not limited to autoregressive neural networks, feedforward neural networks, random forest classifiers, support vector machines and boosted support vector machines. The autoregressive neural network or other model is trained and utilized to predict one or more future states of the SAGD system 104 from historical time series data, where the state of the SAGD system 104 is expressed in terms of one or more of the aforementioned variables or other variables described herein.

Figure 3:
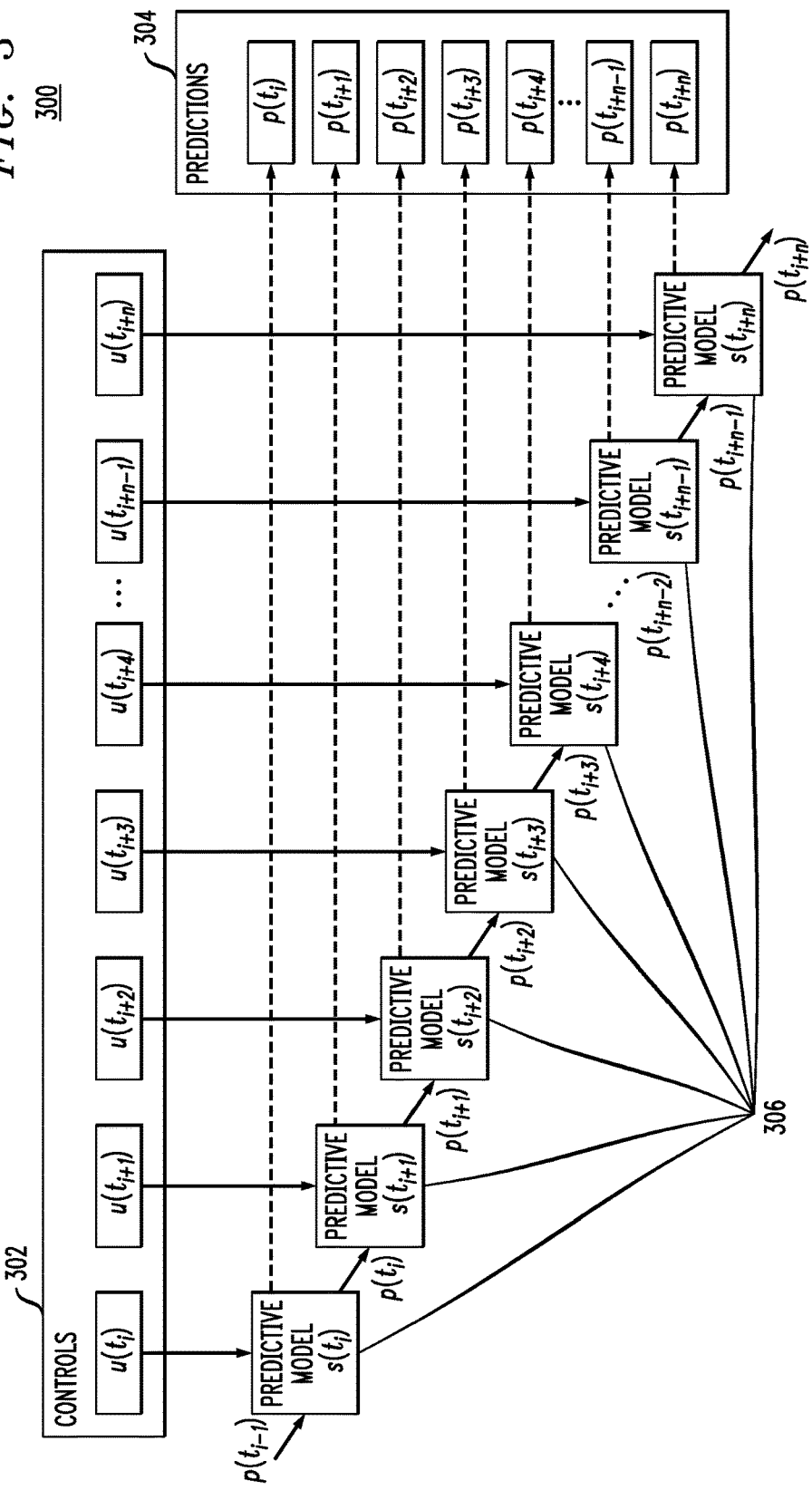
FIG. 3 depicts an architecture of a multi-step predictive model, according to an embodiment of the present invention.

FIG. 3 depicts an architecture 300 of a multi-step predictive model. The architecture 300 includes a set of controls 302, a set of predictions 304 and a set of single-step predictive models 306. At each step, the single-step predictive model receives the prediction from the previous step and a set of controls containing to the specific time step. Using this information, the single-step predictive model computes predictions of observables. In FIG. 3, s denotes the state of the system, u denotes controls and p denotes the prediction of observables. Thus, the single-step predictive model for state $s(t_i)$ at time step $t_i$ takes as input the previous time step predictions or observables, $p(t_{i-1})$, and computes predictions or observables for time step $t_i$, e.g., $p(t_i)$. Each single-step predictive model continues this procedure for a designated number of time steps, so as to produce predictions for multiple time steps.

As mentioned above, the state of SAGD system 104 or some portion of the SAGD system 104 such as a SAGD well pair or SAGD production site at a time $t_i$ may be denoted as $s(t_i)$. The determination of long-term optimal controls may evolve due to the causal nature of the SAGD system 104. The next state, $s(t_{i+1})$ depends on the current state $s(t_i)$ and the controls $u(t_i)$ at that time step.

The single-step predictive models 306 link between such inputs, and can be defined as a non-linear mapping from a set of input $p(t_i)$ and controls $u(t_i)$ to a set of output $p(t_{i+1})$. The relation for the single-step predictive model 306 for time $t_i$ may be denoted as the relation $p(t_{i+1})=m(p(t_i),u(t_i))$. A single-step optimization framework may be defined given the single step predictive modeling capability m.

Given the single step predictive modeling capability m and a given set of observations of the current state in time step $t_i$, $p(t_i)$, the optimization framework seeks to find an optimal or improved set of controls $u(t_i)$ such that a quantity of interest, $q(p(t_{i+1}))=q(m(p(t_i),u(t_i)))$ is optimal in accordance with one or more objectives while honoring a set of operational constraints $c(p(t_{i+1}))=c(m(p(t_i),u(t_i)))\leq 0$.

Observables may include but are not limited to emulsion rate, temperature readings at various locations, pressure readings at various locations, etc. Controls may include but are not limited to steam rate, casing gas pressure, etc. Quantities of interest may include but are not limited to emulsion rate, temperature, pressure and composition, etc. For the SAGD system 104, the objectives may include but are not limited to maximizing or increasing emulsion output or yield, minimizing or reducing a steam to oil ratio, maximizing or increasing a net present value, etc. Examples of constraints for the SAGD system include but are not limited to certain upper bounds on pressure such as bottom hole pressure, certain bounds on temperature such as minimum temperatures at different locations along injector and/or producer wells, sub-cool thresholds, etc.

Mathematically, the above-described single step SAGD optimization problem may be expressed as follows $$\hat{u}(t_i) = \underset{\hat{u}(t_i)}{\mathrm{argmin}}\ q(p(t_{i+1}))$$

$$\text{s.t.}\ \ c(p(t_{i+1}), u(t_i)) \leq 0,$$

which can be further explicated by embedding the predictive model m as follows $$\hat{u}(t_i) = \underset{\hat{u}(t_i)}{\mathrm{argmin}}\ q(m(p(t_i), u(t_i)))$$

$$\text{s.t.}\ \ c(m(p(t_i), u(t_i)) \leq 0.$$

To facilitate long-term production optimization in SAGD system 104, a set of long-term controls is defined as $U(t_1, t_n)=\{u(t_1), u(t_2), u(t_3), \ldots u(t_n)\}$ where each $u(t_i)$ corresponds to a single time step set of controls. Further, long-term predictions are defined as $P(t_1,t_n)=\{p(t_1), p(t_2), p(t_3), \ldots p(t_n)\}$ where each $p(t_i)$ corresponds to a single time step set of predictions. It is important to note that "long-term" in this context refers to production optimization over multiple time steps, as compared to a single time-step optimization.

To predict the response of the SAGD system 104 at time steps $t_1$ to $t_n$, or $P(t_1,t_n)$ to a set of multiple time step controls $U(t_1,t_n)$, various coupled model evaluations may be performed as described below. A multi-step predictive model that maps between $s(t_1)$ and $P(t_1,t_n)$ for a given set of controls $U(t_1,t_n)$ is denoted $P(t_1,t_n)=M(p(t_1),U(t_1,t_n)$. In this notation, the single-step model $p(t_{i+1})=m(p(t_i),u(t_i))$ is $P(t_i, t_{i+1})=M(p(t_i),U(t_i,t_{i+1}))$. In this case, the model will provide the prediction at time $t_{i+1}$ given the predictions from $t_i$ and the controls $u(t_i)$.

The multiple time step model or multi-step model is formulated in a recursive manner, incorporating predictions from the previous time step with the controls of the current time step to provide predictions. The multiple time step optimization framework for the SAGD system 104 can thus be formulated as finding sets of controls $\hat{U}(t_1,t_n)=\{\hat{u}(t_1), \hat{u}(t_2), \hat{u}(t_3), \ldots \hat{u}(t_n)\}$ that optimize one or more quantities of interest $Q(P(t_1,t_n))=Q(M(s(t_i),U(t_i,t_i)))$ relating to an aggregated set of predictions $P(t_1,t_n)$ subject to the multi-step operational constraints set as $C(P(t_1,t_n), U(t_1,t_n))=C(M(s(t_i),U(t_i,t_i)))\leq 0$. The quantities of interest may include but are not limited to cumulative emulsion production, cumulative steam to oil ratio, net value, etc.

Mathematically, the above-described multiple time step predictive model may be expressed as $$\hat{U}(t_1, t_n) = \underset{\hat{U}}{\mathrm{argmin}}\ Q(P(t_1, t_n))$$

$$\text{s.t.}\ \ C(P(t_1, t_n), U(t_1, t_n)) \leq 0,$$

which can be further explicated by embedding the multi-step predictive model M as follows $$\hat{U}(t_1, t_n) = \underset{\hat{U}}{\mathrm{argmin}}\ Q(M(p(t_i), U(t_i, t_i)))$$

$$\text{s.t.}\ \ C(M(p(t_i), U(t_i, t_i))) \leq 0.$$

In some embodiments, control of SAGD system 104 operations across multiple time steps, also referred to herein as a long term horizon, is provided using the above-described multiple time step predictive model and optimization framework. The multiple time step predictive model can utilize exogenous controls and auto-regressive input to provide multiple time step predictions. Thus, in some embodiments the multiple time step predictive model ingests as input the previous time step prediction along with sets of controls for multiple time steps to provide or output sets of predictions for the multiple time steps under consideration.

The multiple time step predictive model may be utilized in the context of an optimization framework to find optimal or improved sets of controls for multiple time steps that optimize a quantity of interest associated with the multiple time step prediction while honoring operational constraints across the multiple time steps. As mentioned above, the quantity or quantities of interest for the SAGD system 104 may include one or more of cumulative emulsion production, cumulative steam to oil ratio, net present value, etc. Operational constraints of the SAGD system 104 may include one or more of pressure thresholds or bounds, temperature thresholds or bounds, flow limits, spatial and temporal variations, sub-cool thresholds, etc.

In the course of the multiple time step optimization, the optimization framework can invoke calls to the multiple time step predictive model with various sets of multiple time step controls to direct towards improvement and/or feasibility in the quantities of interest. The optimization framework may employ sensitivity relations that are derived from the multiple time step predictive model to link between changes in the sets of multiple time step controls and respective changes in the multiple time step predictions, or directly to the quantity or quantities of interest and the respective constraint values. For extended horizon control of operations in the SAGD system 104, the control space is thus extended to accommodate controls of multiple time steps, and the embedded predictive model is nested canonically to provide multiple time step prediction.

Figure 4:
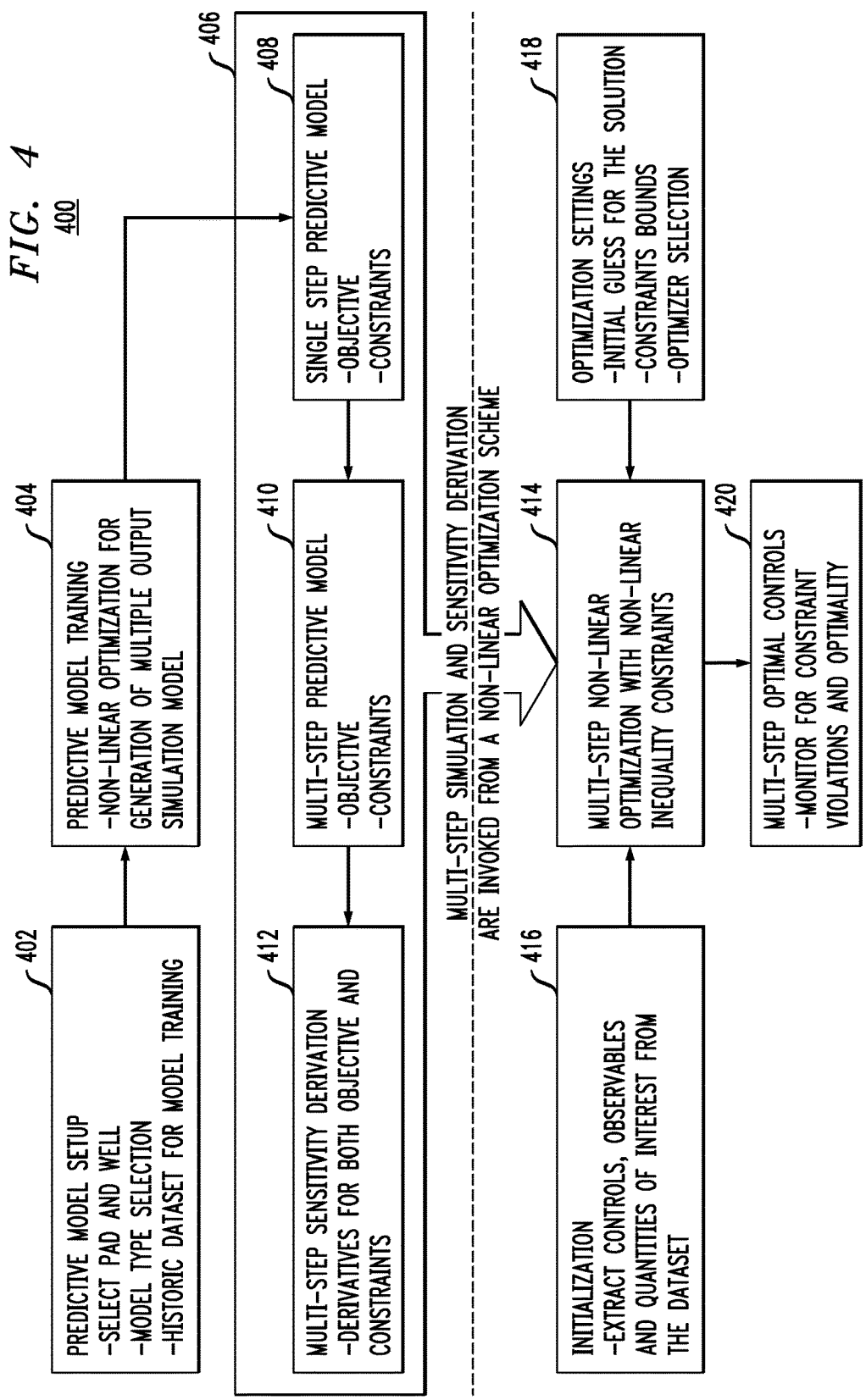
FIG. 4 depicts a process for generating multiple time step controls of a SAGD system, according to an embodiment of the present invention.

FIG. 4 depicts a flow 400 for generating multiple time step controls for SAGD system 104. In block 402, the predictive model is set up by selecting at least a portion of the SAGD system 104, selecting a model type, and obtaining a historical dataset for use in model training. Selecting the portion of the SAGD system 104 may include selecting individual wells or SAGD well pairs 208, selecting groups of SAGD well pairs 208 such as a pad or particular one of the SAGD production sites 204, selecting a group of two or more SAGD production sites 204, etc.

Model type selection may include selecting amongst different types of neural networks or other machine learning models. The selected model may be, for example a NARX neural network or other type of feed forward network or machine learning model including but not limited to support vector classifiers, boosted support vector classifiers, random forest classifiers, etc. Selecting the model type in some embodiment further includes selecting a non-linear multiple output simulation model or selecting multiple non-linear single output simulation models.

The historical data set, or historical time series data, may be obtained directly from sensors in the SAGD system 104, from a historical database 106, or from some combination of these and other sources.

Block 404 includes predictive model training, which may involve a non-linear optimization for generation of a multiple output simulation model. The selected model may, in some cases, be a multiple input-multiple output model. NARX neural networks for example, may be designed to take multiple inputs and provide multiple outputs. Described below are possible inputs and outputs for the model in some embodiments. It is to be appreciated, however, that the inputs and outputs described below are given by way of example only and that other possible inputs and/or outputs may be used in other embodiments.

Model inputs may include, by way of example, heel steam rate, toe steam rate, cumulative injected steam and energy or integrated total mass and total energy inserted (as measured from some defined start time), gas casing pressure, emulsion pressure, mass differential, cumulative mass differential, energy differential and cumulative energy differential.

The heel steam rate and toe steam rate may be associated with a producer well or injector well at a particular SAGD well pair of a SAGD production site. The total steam rate and cumulative injected steam may refer to a SAGD production site, a SAGD well pair at a particular SAGD production site, etc. The gas casing pressure may be with reference to a producer well or injector well at a particular SAGD well pair of a SAGD production site. The emulsion pressure input may be with respect to a producer well at a particular SAGD well pair, or may refer to a group of producer wells at a given SAGD production site or SAGD production sites.

The current mass differential may be measured as a difference between material input at an injector well (e.g., steam) and material output of a producer well (e.g., emulsion) for a particular SAGD well pair at a point in time, or possibly for a group of SAGD well pairs at one or more SAGD production sites at a point in time. The cumulative mass differential or integrated total mass inserted, as described above, may be a measure of the difference between the material input at an injector well (e.g., steam) and the material output of a producer well (e.g., emulsion) for a particular SAGD well pair for a defined time period, or possibly for a group of SAGD well pairs at one or more SAGD production sites for a defined time period. The integrated total energy inserted, as described above, may be a measure of the energy of the material input at an injector well (e.g., steam) for a particular SAGD well pair for a defined time period, or possibly for a group of SAGD well pairs at one or more SAGD production sites for a defined time period.

The energy differential may be a measure of a difference between the energy of material added at an injector well (e.g., the enthalpy of steam added) and material output at a producer well (e.g., the enthalpy of the emulsion) for a particular SAGD well pair at a point in time, or possibly for a group of SAGD well pairs at one or more SAGD production sites at a point in time. The cumulative energy differential may be a measure of the difference between the energy of material added at an injector well (e.g., the enthalpy of steam added) and the energy of material output at a producer well (e.g., the enthalpy of the emulsion) for a particular SAGD well pair for a defined time period, or possibly for a group of SAGD well pairs at one or more SAGD production sites for a defined time period.

Model outputs may include, by way of example, emulsion rate, blanket gas pressure, temperature, sub-cool, heel steam pressure and toe steam pressure. The emulsion rate may be an output rate for a particular SAGD well pair, for a group of SAGD well pairs at one or more SAGD production sites, etc. The blanket gas pressure may be for an injector well of a particular SAGD well pair.

In some wells, temperature and sub-cool are measured at intervals such as every meter. In other wells, temperature and sub-cool measurements may be obtained using a single sensor. The outputs relating to temperature and sub-cool that are distributed and numerous can be divided into zones for convenience. In one embodiment they are divided into zones 1 and 2, and further into outputs A and B. Zones 1 and 2 may refer to temperature readings at particular points in a SAGD production site, a particular SAGD well pair, along the length of an injector well or producer well of a particular SAGD well pair, etc. Zones 1 and 2 may also utilize multiple temperature readings for a section or portion of the injector well or producer well of a particular SAGD well pair, or for particular sections or portions of a SAGD well pair or SAGD production site, etc. The values A and B may indicate different values for the respective zones. For example, the values A and B may indicate maximum and minimum temperatures, respectively, or the mean temperature and deviation, respectively, etc. At a given SAGD well pair, or SAGD production site, there may be hundreds or thousands of temperature measurements taken at different locations. The number of outputs relating to temperature may vary as desired for a particular implementation, such as using one zone or more than two zones. In a similar manner, the numbers of other inputs and outputs used may vary, such as for example using multiple different pressure readings for different zones or locations, etc.

The sub-cool output may be measured for a particular SAGD well pair, for a group of two or more SAGD well pairs at one or more SAGD production sites, etc. Temperature and pressure readings may be used to compute enthalpy of the output of a producer well to determine if the emulsion output is in a gas or liquid phase. The sub-cool level or threshold gives a degree or margin to prevent ingestion of steam into the producer well. Negative sub-cool refers to a situation in which the enthalpy of the emulsion is less than the enthalpy of steam, and has adverse effects such as the ingestion of sand or gravel into the producer well. A sub-cool level or threshold may be set to 10% or more in some embodiments, but is more generally set so as to obtain as much bitumen in the emulsion output without ingesting sand, gravel or other undesirable particulates into the producer well.

Heel and toe steam pressure outputs may be measured for a producer well at a particular SAGD well pair.

Block 406 includes setup of the multiple time step predictive model of the SAGD system 104. In block 408, a single step predictive model is generated using a set of objectives and constraints. A multi-step predictive model is generated in block 410 using a set of objectives and constraints, and the multiple time step sensitivity derivations or links are generated in block 412. The architecture 300 described above with respect to FIG. 3 may be used as the multiple time step predictive model in block 410.

The multiple time step predictive model and sensitivity derivations are invoked in a non-linear optimization scheme, shown as block 414 in flow 400. The non-linear optimization scheme of block 414 utilizes one or more non-linear inequality constraints, and is initialized in block 416 by extracting controls, observables and quantities of interest from the dataset. Optimization settings for the non-linear optimization scheme of block 414 include an initial guess for the solution, constraint bounds and optimizer selection. The non-linear optimization scheme of block 414 outputs multiple time step optimal controls in block 420, which monitors for constraint violations and performance or optimality.

Figure 5:
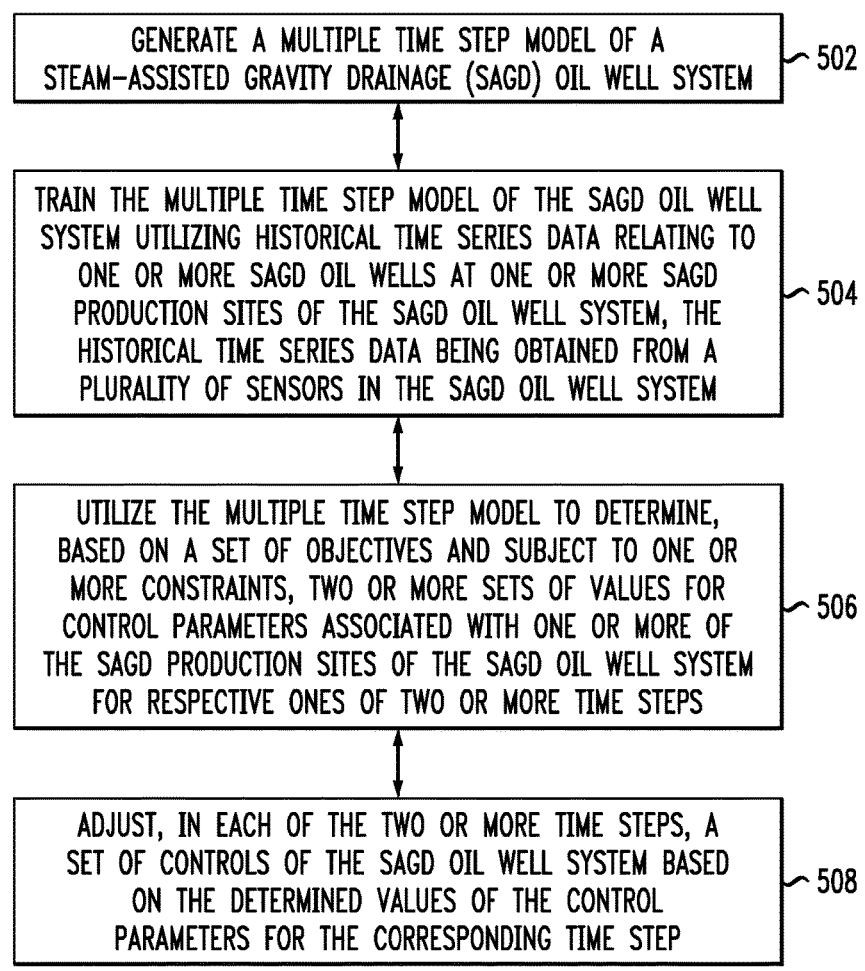
FIG. 5 depicts a process for adjusting multiple time step controls in a SAGD system, according to an embodiment of the invention.

FIG. 5 shows a process 500 for adjusting multiple time step controls in a SAGD system, such as SAGD system 104. SAGD multi-step modeling system 102 may be used to implement process 500. The process 500 begins with step 502, generating a multiple time step model of the SAGD system 104. In step 504, the multiple time step model of the SAGD system 104 is trained utilizing historical time series data relating to one or more SAGD oil wells such as SAGD well pairs 208 at one or more SAGD production sites 204 of the SAGD system 104. The historical time series data may be obtained at least in part from a plurality of sensors in the SAGD system, such as the sensors 214 in SAGD well pair 208-1. The historical time series data may, in some embodiments, include at 2-5 days of historical data relating to one or more SAGD oil wells in the SAGD system 104. In other embodiments, more or less than 2 to 5 days of historical time series data may be used.

Generating the multiple time step model in step 502, in some embodiments, includes selecting one or more the SAGD oil wells or well pairs in SAGD system 104 and selecting a model type for the selected SAGD oil wells. Training the multiple time step model in step 504 may include obtaining the historical time series data for the selected SAGD oil wells and training the selected model type using the historical time series data for the selected SAGD oil wells. The selected model type may be a non-linear multiple output simulation model or multiple non-linear single output simulation models. The selected model type may utilize one or more machine learning algorithms selected from nonlinear autoregressive neural networks, feedforward neural networks, support vector classifiers, boosted support vector classifiers and random forest classifiers.

The multiple time step model generated in step 502 may utilize auto-regressive input to provide multiple time step predictions of a set of observable parameters of the SAGD oil well system. The architecture 300 shown in FIG. 3 and described above provides an example of such a multi-step predictive model. The multiple time step model may utilize as input one or more previous time step predictions and two or more sets of exogenous controls of the SAGD system 104 for respective ones of two or more time steps to provide the multiple time step predictions of the set of observable parameters of the SAGD system 104. The multiple time step model may be used to generate a multi-step optimization framework that employs sensitivity relations that link between changes in the two or more sets of values for the control parameters and changes in forecast emulsion production for the SAGD system 104.

The process 500 continues with step 506, utilizing the multiple time step model to determine based on a set of objectives and subject to one or more constraints, two or more sets of values for control parameters associated with one or more of the SAGD production sites of the SAGD oil well system for respective ones of two or more time steps. In step 508, a set of controls of the SAGD system 104 is adjusted in each of the two or more time steps based on the values for the control parameters determined in step 506 for that corresponding time step. In some embodiments, step 506 is repeated after each time step to provide updated values for the control parameters in multiple time steps based on new information or observables of the SAGD system 104.

In some embodiments, step 506 utilizes an objective of increasing cumulative emulsion production in the SAGD system 104 for the two or more time steps. For this objective, determining the two or more sets of values for the control parameters comprises selecting, for a given one of the two or more time steps, a first set of values for the control parameters over a second set of values for the control parameters. The second set of values for the control parameters provides an increased emulsion production in the SAGD oil well system for the given time step relative to the first set of values for the control parameters. The first set of values for the control parameters, however, provides an increased cumulative emulsion production in the SAGD oil well system for the two or more time steps relative to the second set of values for the control parameters.

In other embodiments, step 506 utilizes an objective of decreasing a cumulative steam to oil ratio for the SAGD oil well system for the two or more time steps. For this objective, determining the two or more sets of values for the control parameters comprises selecting, for a given one of the two or more time steps, a first set of values for the control parameters over a second set of values for the control parameters. The second set of values for the control parameters provides a decreased steam to oil ratio in the SAGD system 104 for the given time step relative to the first set of values for the control parameters. The first set of values for the control parameters, however, provides a decreased cumulative steam to oil ratio in the SAGD system 104 for the two or more time steps relative to the second set of values for the control parameters.

In other embodiments, step 506 utilizes an objective of increasing a net present value of the SAGD oil well system following the two or more time steps. For this objective, determining the two or more sets of values for the control parameters comprises selecting, for a given one of the two or more time steps, a first set of values for the control parameters over a second set of values for the control parameters. The second set of values for the control parameters provides an increased net present value of the SAGD system 104 after the given time step relative to the first set of values for the control parameters. The first set of values for the control parameters, however, provides an increased net present value of the SAGD system 104 following the two or more time steps relative to the second set of values for the control parameters.

While three different objectives are discussed above (increasing cumulative emulsion production, decreasing cumulative steam to oil ratio and increasing net present value), embodiments are not limited to use with these objectives. Other embodiments may utilize other objectives, including combinations of two or more of these and other objectives. As an example, another objective may be to reduce the amount of steam utilized in the SAGD system 104 while maintaining a threshold emulsion production in the SAGD system 104.

The one or more constraints used in step 506 may include, by way of example, one or more threshold pressures, temperatures, sub-cool levels, etc. associated with individual injector or producer wells, with one or more SAGD well pairs 208, with one or more SAGD production sites, and/or the SAGD system 104.

Adjusting the set of controls in step 508 may include, by way of example, controlling the respective rates of steam allocated to injector wells of one or more SAGD well pairs 208 at one or more of the SAGD production sites 204 in the SAGD system 104, allocation of steam between two or more different SAGD production sites 205 in the SAGD system 104, allocation of steam between two or more different injectors wells at two or more different SAGD well pairs 208 at a given SAGD production site 204 in the SAGD system 104, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
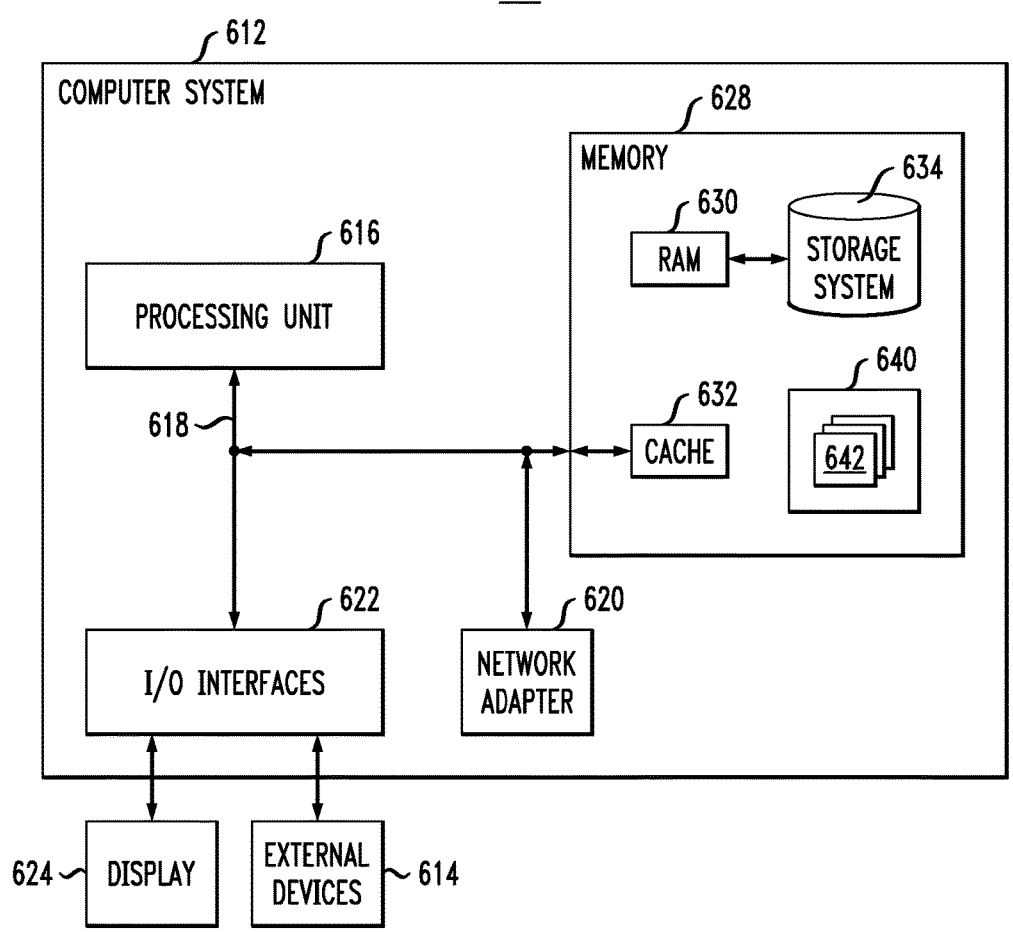
FIG. 6 depicts a computer system in accordance with which one or more components/steps of techniques of the invention may be implemented, according to an embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via I/O interfaces 622. Still yet, computer system/server 612 can communicate with one or more networks such as a LAN, a general WAN, and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
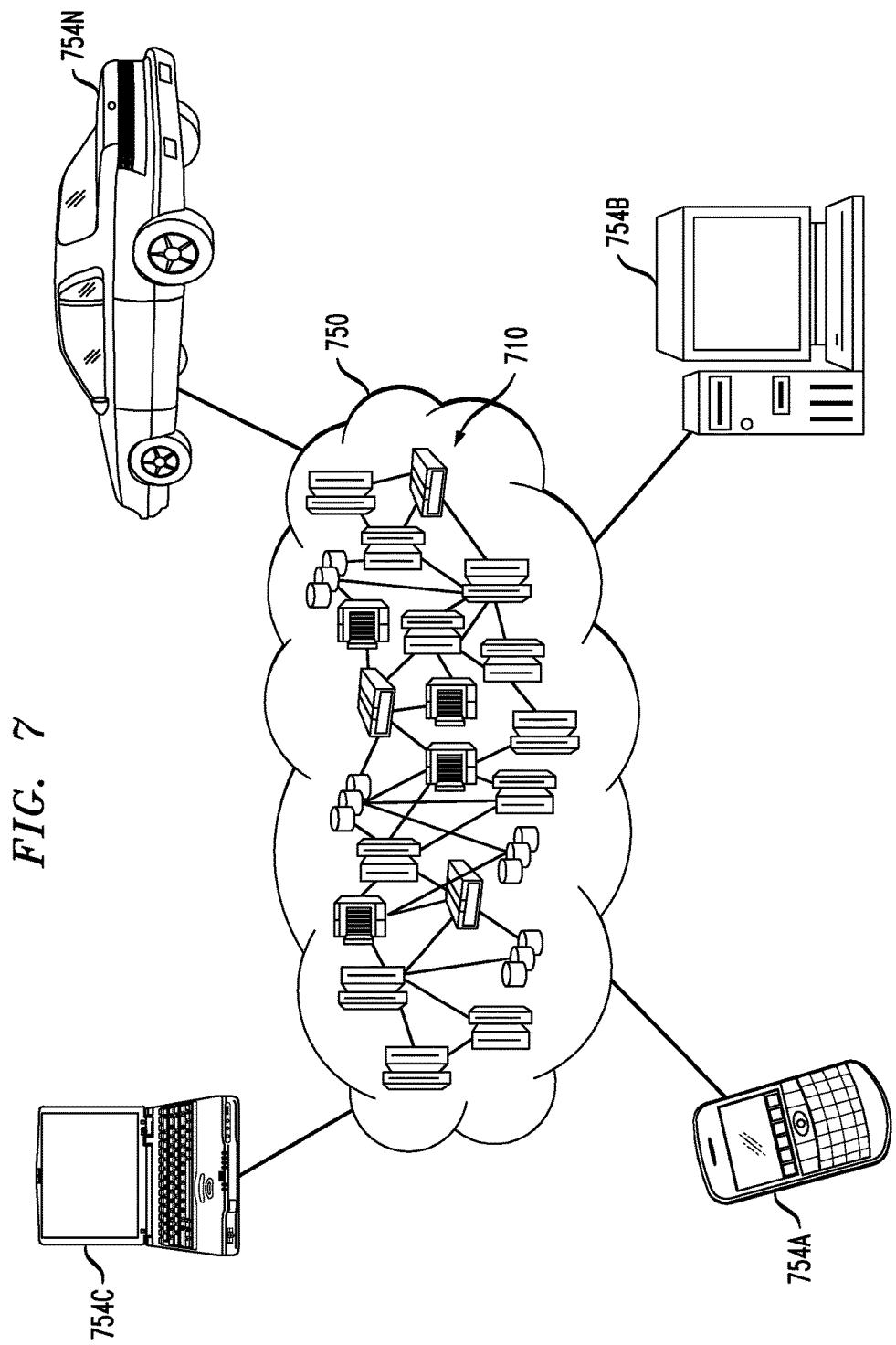
FIG. 7 depicts a cloud computing environment, according to an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
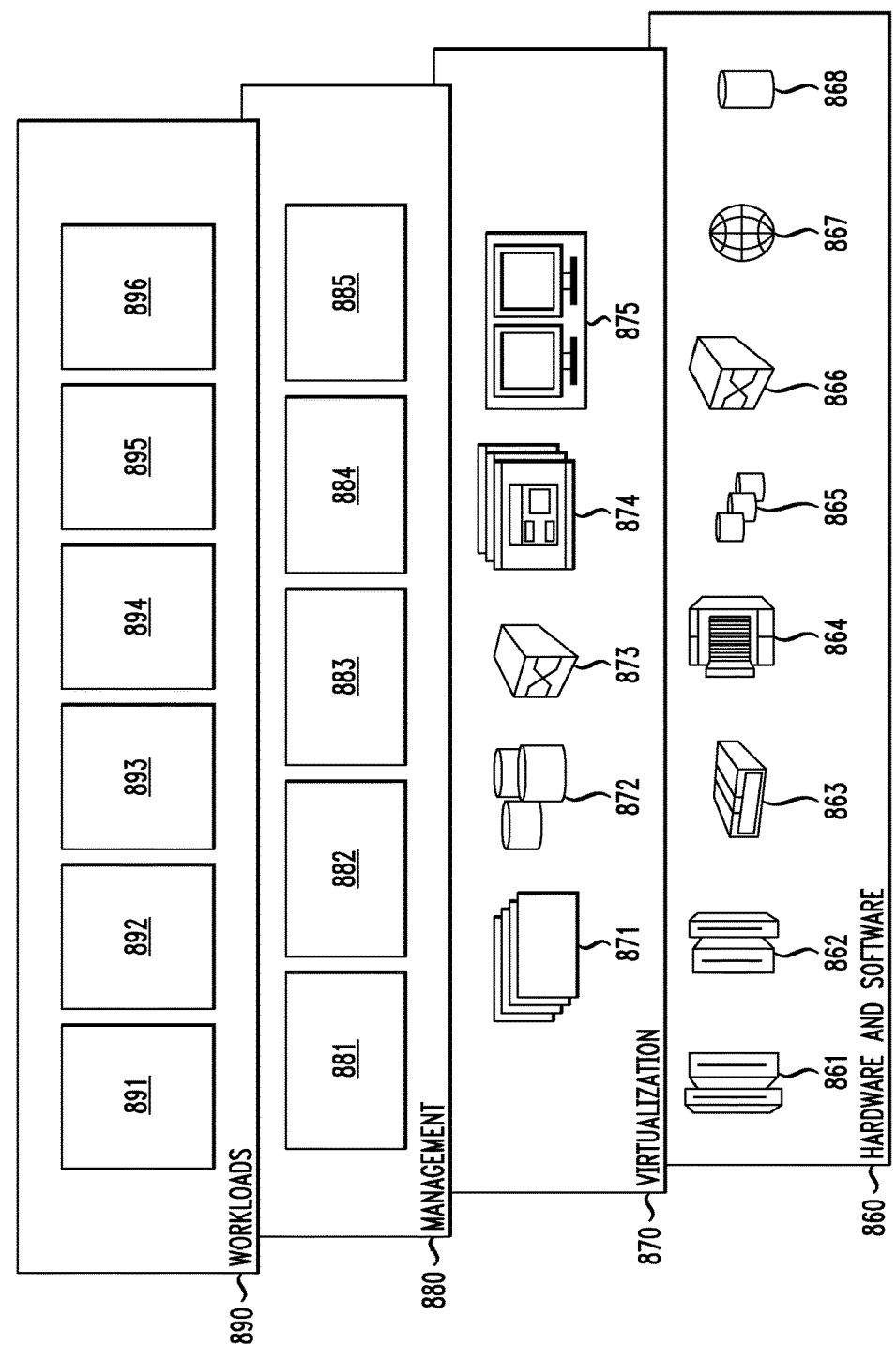
FIG. 8 depicts abstraction model layers, according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and multiple step SAGD multi-step modeling 896, which may perform various functions described above with respect to SAGD multi-step modeling system 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for increasing efficiency in emulsion production for a steam-assisted gravity drainage (SAGD) oil well system comprising:
   generating a multiple time step model of the SAGD oil well system;
   training the multiple time step model of the SAGD oil well system utilizing historical time series data relating to one or more SAGD oil wells at one or more SAGD production sites of the SAGD oil well system, the historical time series data being obtained from a plurality of sensors in the SAGD oil well system;
   utilizing the multiple time step model to determine, based on a set of objectives and subject to one or more constraints, two or more sets of values for control parameters associated with one or more of the SAGD production sites of the SAGD oil well system for respective ones of two or more consecutive time steps; and
   adjusting, in each of the two or more consecutive time steps, a set of controls of the SAGD oil well system based on the determined values of the control parameters for the corresponding time step;
   wherein the method is performed by at least one processing device comprising a processor coupled to a memory, the processing device being operatively coupled to the SAGD oil well system; and
   wherein adjusting the set of controls of the SAGD oil well system comprises selecting, for a given one of the two or more consecutive time steps, a first set of values for the controls that meet the one or more objectives for the two or more consecutive time steps collectively over a second set of values for the controls that meet the one or more objectives for the given time step individually.

2. The method of claim 1, wherein generating the multiple time step model comprises:
   selecting one or more the SAGD oil wells; and
   selecting a model type for the selected SAGD oil wells.

3. The method of claim 2, wherein training the multiple time step model comprises:
   obtaining the historical time series data for the selected SAGD oil wells; and
   training the selected model type using the historical time series data for the selected SAGD oil wells.

4. The method of claim 2, wherein the selected model type comprises a non-linear multiple output simulation model.

5. The method of claim 2, wherein the selected model type comprises multiple non-linear single output simulation models.

6. The method of claim 2, wherein the selected model type utilizes one or more machine learning algorithms selected from nonlinear autoregressive neural networks, feedforward neural networks, support vector classifiers, boosted support vector classifiers and random forest classifiers.

7. The method of claim 1, wherein the multiple time step model utilizes auto-regressive input to provide multiple time step predictions of a set of observable parameters of the SAGD oil well system.

8. The method of claim 7, wherein the multiple time step model utilizes as input one or more previous time step predictions and two or more sets of exogenous controls of the SAGD oil well system for respective ones of two or more time consecutive steps to provide the multiple time step predictions of the set of observable parameters of the SAGD oil well system.

9. The method of claim 7, wherein the multiple time step model is used to generate a multi-step optimization framework that employs sensitivity relations that link between changes in the two or more sets of values for the control parameters and changes in forecast emulsion production for the SAGD oil well system.

10. The method of claim 1, wherein the one or more objectives comprise increasing cumulative emulsion production in the SAGD oil well system for the two or more consecutive time steps.

11. The method of claim 10, wherein:
the second set of values for the controls provides an increased emulsion production in the SAGD oil well system for the given time step individually relative to the first set of values for the controls; and
the first set of values for the controls provides an increased cumulative emulsion production in the SAGD oil well system for the two or more consecutive time steps collectively relative to the second set of values for the controls.

12. The method of claim 1, wherein the one or more objectives comprise decreasing a cumulative steam to oil ratio for the SAGD oil well system for the two or more consecutive time steps.

13. The method of claim 12, wherein:
the second set of values for the controls provides a decreased steam to oil ratio in the SAGD oil well system for the given time step individually relative to the first set of values for the controls; and
the first set of values for the controls provides a decreased cumulative steam to oil ratio in the SAGD oil well system for the two or more consecutive time steps collectively relative to the second set of values for the controls.

14. The method of claim 1, wherein the one or more objectives comprises increasing a net present value of the SAGD oil well system following the two or more consecutive time steps.

15. The method of claim 14, wherein:
the second set of values for the controls provides an increased net present value of the SAGD oil well system after the given time step individually relative to the first set of values for the controls; and
the first set of values for the controls provides an increased net present value of the SAGD oil well system following the two or more consecutive time steps collectively relative to the second set of values for the controls.

16. The method of claim 1, wherein the one or more constraints comprise at least one of:
at least one threshold pressure for a given one of the SAGD production sites in the SAGD oil well system; and
at least one threshold temperature at the given SAGD production site in the SAGD oil well system.

17. The method of claim 1, wherein the one or more constraints comprise a threshold sub-cool level at a given one of the SAGD production sites in the SAGD oil well system.

18. The method of claim 1, wherein the set of controls comprises one or more of:
respective rates of steam allocated to injector wells of one or more SAGD well pairs at one or more of the SAGD production sites in the SAGD oil well system;
allocation of steam between two or more different SAGD production sites in the SAGD oil well system; and
allocation of steam between two or more different injectors wells at two or more different SAGD well pairs at a given SAGD production site in the SAGD oil well system.

19. A computer program product for increasing efficiency in emulsion production for a steam-assisted gravity drainage (SAGD) oil well system comprising a computer readable storage medium for storing computer readable program code which, when executed, causes a computer:
to generate a multiple time step model of the SAGD oil well system;
to train the multiple time step model of the SAGD oil well system utilizing historical time series data relating to one or more SAGD oil wells at one or more SAGD production sites of the SAGD oil well system, the historical time series data being obtained from a plurality of sensors in the SAGD oil well system;
to utilize the multiple time step model to determine, based on a set of objectives and subject to one or more constraints, two or more sets of values for control parameters associated with one or more of the SAGD production sites of the SAGD oil well system for respective ones of two or more consecutive time steps; and
to adjust, in each of the two or more consecutive time steps, a set of controls of the SAGD oil well system based on the determined values of the control parameters for the corresponding time step;
wherein adjusting the set of controls of the SAGD oil well system comprises selecting, for a given one of the two or more consecutive time steps, a first set of values for the controls that meet the one or more objectives for the two or more consecutive time steps collectively over a second set of values for the controls that meet the one or more objectives for the given time step individually.

20. An apparatus for increasing efficiency in emulsion production for a steam-assisted gravity drainage (SAGD) oil well system comprising:
a memory; and
a processor coupled to the memory and configured:
to generate a multiple time step model of the SAGD oil well system;
to train the multiple time step model of the SAGD oil well system utilizing historical time series data relating to one or more SAGD oil wells at one or more SAGD production sites of the SAGD oil well system, the historical time series data being obtained from a plurality of sensors in the SAGD oil well system;
to utilize the multiple time step model to determine, based on a set of objectives and subject to one or more constraints, two or more sets of values for control parameters associated with one or more of the SAGD production sites of the SAGD oil well system for respective ones of two or more consecutive time steps; and
to adjust, in each of the two or more consecutive time steps, a set of controls of the SAGD oil well system based on the determined values of the control parameters for the corresponding time step;

wherein adjusting the set of controls of the SAGD oil well system comprises selecting, for a given one of the two or more consecutive time steps, a first set of values for the controls that meet the one or more objectives for the two or more consecutive time steps collectively over a second set of values for the controls that meet the one or more objectives for the given time step individually.

* * * * *

UNITED STATES PATENT AND TRADEMARK OFFICE
CERTIFICATE OF CORRECTION

PATENT NO.        : 10,352,142 B2
APPLICATION NO.   : 15/276178
DATED             : July 16, 2019
INVENTOR(S)       : Andrew R. Conn et al.

Page 1 of 1

It is certified that error appears in the above-identified patent and that said Letters Patent is hereby corrected as shown below:

On the Title Page

Item (54) and in the Specification, Column 1, Line 1:
Please delete "STEM-ASSISTED" and insert -- STEAM-ASSISTED --

Signed and Sealed this
Third Day of September, 2019

Andrei Iancu
*Director of the United States Patent and Trademark Office*